United States Patent
He et al.

(10) Patent No.: US 8,465,844 B2
(45) Date of Patent: Jun. 18, 2013

(54) ELASTIC ATTACHMENT ADHESIVE CONTAINING RADIAL BLOCK COPOLYMER

(75) Inventors: Qiwei He, Belle Mead, NJ (US); Michael G. Harwell, Hillsborough, NJ (US)

(73) Assignee: Henkel AG & Co. KGaA, Duesseldorf (DE)

( * ) Notice: Subject to any disclaimer, the term of this patent is extended or adjusted under 35 U.S.C. 154(b) by 446 days.

(21) Appl. No.: 10/779,505

(22) Filed: Feb. 13, 2004

(65) Prior Publication Data

US 2005/0181207 A1      Aug. 18, 2005

(51) Int. Cl.
    *C08L 53/02* (2006.01)
(52) U.S. Cl.
    USPC .................. 428/500; 428/523; 525/89
(58) Field of Classification Search
    USPC .......................................... 525/89
    See application file for complete search history.

(56) References Cited

U.S. PATENT DOCUMENTS

| | | | |
|---|---|---|---|
| 3,699,184 A * | 10/1972 | Taylor et al. | 525/89 |
| 3,700,633 A | 10/1972 | Wald et al. | |
| 5,037,411 A | 8/1991 | Malcolm et al. | |
| 5,037,441 A | 8/1991 | Bouvet | |
| 5,057,571 A | 10/1991 | Malcolm et al. | |
| 5,064,905 A * | 11/1991 | Stamhuis et al. | 525/237 |
| 5,149,741 A | 9/1992 | Alper et al. | |
| 5,266,394 A | 11/1993 | Diehl et al. | |
| 5,292,819 A * | 3/1994 | Diehl et al. | 525/314 |
| 5,372,870 A | 12/1994 | Diehl et al. | |
| 5,523,343 A | 6/1996 | Giordano et al. | |
| 5,532,319 A * | 7/1996 | Asahara et al. | 525/89 |
| 5,663,228 A | 9/1997 | Sasaki et al. | |
| 5,703,162 A | 12/1997 | Anderson | |
| 5,750,607 A | 5/1998 | Gerard et al. | |
| 5,916,959 A | 6/1999 | Lindquist et al. | |
| 5,939,482 A | 8/1999 | Kriessmann et al. | |
| 5,939,483 A * | 8/1999 | Kueppers | 524/487 |
| 6,034,159 A | 3/2000 | Malcolm et al. | |
| 6,324,703 B1 * | 12/2001 | Chen | 2/458 |
| 6,531,544 B1 | 3/2003 | Vaughan et al. | |
| 6,534,593 B1 | 3/2003 | Komatsuzaki et al. | |
| 7,655,720 B2 | 2/2010 | He et al. | |
| 2005/0020773 A1 * | 1/2005 | Lechat et al. | 525/89 |
| 2005/0182183 A1 * | 8/2005 | He et al. | 524/515 |
| 2005/0182194 A1 | 8/2005 | He et al. | |

FOREIGN PATENT DOCUMENTS

| | | |
|---|---|---|
| EP | 0368141 A2 | 5/1990 |
| EP | 0 798 358 | 10/1997 |
| JP | 01266156 A | 10/1989 |
| WO | 9220725 A1 | 11/1992 |
| WO | 9928405 A1 | 6/1999 |

OTHER PUBLICATIONS

"Eastman, Light-Colored Resins." Loos & Dilworth, Inc., 1998, Retrieved from http://www.loosanddilworth.com/chemidcal/lightcolresins2/ on Sep. 6, 2011.

* cited by examiner

*Primary Examiner* — Jeffrey Mullis
(74) *Attorney, Agent, or Firm* — Sun Hee Lehrmann

(57) ABSTRACT

Hot melt adhesive compositions containing radial polystyrene-polyisoprene/polybutadiene block copolymer and use as elastic attachment adhesive in the manufacture of disposable absorbent elastic articles.

10 Claims, No Drawings

ELASTIC ATTACHMENT ADHESIVE CONTAINING RADIAL BLOCK COPOLYMER

FIELD OF THE INVENTION

The invention relates to adhesive compositions, and more particularly to hot melt adhesives comprising a radial block copolymer that find use as an elastic attachment adhesive and elastic-containing products manufactured therewith.

BACKGROUND OF THE INVENTION

Hot melt adhesives are applied to a substrate while in its molten state and cooled to harden the adhesive layer. Such adhesives are widely used for various commercial and industrial applications such as product assembly and packaging, and have been widely used in the non-woven industry to make baby diapers and adult incontinence products. In these applications, adhesive is applied to at least one polyolefin non-woven substrate, at least one elastic, such as spandex, and/or at least one polyolefin film to bind the substrates together.

While hot melt adhesives are conventionally used in the non-woven applications, there continues to be a need for adhesives formulated to more effectively bond certain types of substrates for certain end use applications together. The current invention addresses this need.

SUMMARY OF THE INVENTION

It has been discovered that hot melt adhesive which comprises from about 15 wt % to about 35 wt % of a (PS-PI-PB)$_n$X radial block copolymer where the number of PS-PI-PB arms, n, is equal to or greater than 3, up to about 20 wt % of a linear block copolymer such as SBS, SEBS, SEPS, SIBS, and combinations thereof, and from about 30 to about 70 wt % of a tackifying resin are particularly well suited for elastic attachment applications.

One embodiment of the invention is directed to adhesive compositions which comprise from about 15 wt % to about 35 wt % of a (PS-PI-PB)$_n$X radial block copolymer. The adhesive exhibits good creep performance when used as an elastic attachment adhesive in the manufacture of articles comprising an elastic region, such as is found in disposable absorbent garments comprising one or more elastic cuffs positioned to contact the legs or waist of the wearer.

Another embodiment of the invention is directed to an article of manufacture comprising an adhesive which comprises from about 15 to about 35 wt % of a (PS-PI-PB)$_n$X radial block-copolymer where the number of PS-PI-PB arms, n, is equal to or greater than 3, up to about 20 wt % of a linear block copolymer such as SBS, SEBS, SEPS, SIBS, and combinations thereof, and from about 30 to about 70 wt % of a tackifying resin. Articles of manufacture will comprise at least one elastic substrate. Encompassed by the invention are disposable absorbent articles, specifically disposable elastic articles, including disposable absorbent garments.

Still another embodiment of the invention is directed to a process for bonding a substrate to a similar or dissimilar substrate comprising applying to at least a first substrate a molten hot melt adhesive composition, bringing at least a second substrate in contact with the adhesive present on the first substrate whereby said first and second substrates are bonded together. In the practice of the invention at least one of said first and/or said second substrate is an elastomeric polyurethane fiber (spandex). The adhesive composition used in the process comprises from about 15 wt % to about 35 wt % of a (PS-PI-PB)$_n$X radial block-copolymer where n is equal to or greater than 3, up to about 20 wt % of a linear block copolymer such as SBS, SEBS, SEPS, SIBS, and combinations thereof, and from about 30 to about 70 wt % of a tackifying resin.

DETAILED DESCRIPTION OF THE INVENTION

All documents cited herein are incorporated in their entireties by reference.

The present invention provides a hot melt adhesive composition. Compositions of the invention are formulated for excellent bond strength with lower polymer content in the formulation, resulting in a highly effective adhesive system.

One of the most important properties required in elastic attachment is creep performance. As such, an adhesive with excellent toughness is required. The adhesives of the invention meet the rigorous requirements needed in elastic attachment applications and other applications. The adhesives are thus particularly useful in making elastic non-wovens and in the fabrication of baby diapers, training pants, adult incontinence briefs or undergarments, and the like.

The hot melt adhesives of the invention comprise a radial block copolymer, a thermoplastic elastomer, a tackifying resin, and, if desired, other additives such as diluents, waxes and the like.

Radial block copolymers for use in the practice of the invention are polystyrene-polyisoprene/polybutadiene block copolymers having the structure (PS-PI-PB)$_n$X, where PS is polystyrene, PI polyisoprene, PB is polybutadiene, X is a residue of a multifunctional coupling agent used in the production of the radial block copolymer, and n is a number equal to or greater than 3 and represents the number of PS-PI-PB arms appended to X. The number n will range on average from about 3 up to about 10, preferable from about 3 to about 7, and most typically from about 3.5 to about 4. Preferred are radial styrene-isoprene-butadiene styrene copolymers having a di-block percentage of less than about 25% by weight of the copolymer (coupling efficiency greater than 75%), and preferable less than about 20% by weight of the copolymer (coupling efficiency greater than 80%), and in which the number average molecular weight of each arm is between about 30,000 and about 95,000, making the total number average molecular weight of the block copolymer less than about 380,000. Preferably, the styrene block components of the radial block copolymer will be between about 25% to about 50% by weight of the copolymer. Radial block copolymers of the type contemplated for use in the practice of the invention and methods of making such radial block copolymers are described in the U.S. Pat. No. 5,372,870.

In more detail, the adhesives of the invention will comprise from about 15 wt % to about 35 wt % of at least one thermoplastic radial block copolymer, specifically (styrene-isoprene-butadiene)$_n$-X. In the practice of the invention n is 3 or greater, typically 3 up to about 10, more typically 3-6.

The structure of each arm of the (PS-PI-PB)$_n$X radial polymer, namely, the structure of the styrene-isoprene-butadiene block copolymer can be defined as followed: PS has a number average molecular weight about 10,000 to about 25,000. PI+PB has a number average molecular weight ranging from about 20,000 to about 70,000. This gives the number average molecular weight of each arm in the radial block copolymer of from about 30,000 to about 95,000. The overall number average molecular weight of an entire radial block copolymer ranges from about 90,000 to about 380,000, and wherein the PS component is present in an amount of at least about 25 parts to about 50 parts per 100 parts by weight of the copolymer.

The adhesive in the present invention also will comprise at least one linear block copolymer having the general configuration A-B-A wherein the polymer end-blocks A are non-elastomeric polymer blocks which, as homopolymers, have glass transition temperatures above about 20° C., while the elastomeric polymer mid-blocks B are derived from isoprene, butadiene or isobutylene which may be partially or substantially hydrogenated or mixtures thereof.

The non-elastomeric end-blocks A may comprise homopolymers or copolymers of vinyl monomers such as vinyl arenes, vinyl pyridines, vinyl halides and vinyl carboxylates, as well as acrylic monomers such as acrylonitrile, methacrylonitrile, esters of acrylic acids, etc. Monovinyl aromatic hydrocarbons include particularly those of the benzene series such as styrene, vinyl toluene, vinyl xylene, and ethyl vinyl benzene as well as dicyclic monovinyl compounds such as vinyl naphthalene and the like. Other non-elastomeric polymer blocks may be derived from alpha olefins, alkylene oxides, acetals, urethanes, etc. Styrene is preferred.

The elastomeric mid-block B component making up the remainder of the thermoplastic elastomeric copolymer is derived from isoprene or butadiene which may be hydrogenated as taught, for example, in U.S. Pat. No. 3,700,633. This hydrogenation of butadiene may be either partially or substantially complete. Selected conditions may be employed for example to hydrogenate the elastomeric butadiene block while not so modifying the vinyl arene polymer blocks. Other conditions may be chosen to hydrogenate substantially uniformly along the polymer chain, both the elastomeric and non-elastomeric blocks thereof being hydrogenated to practically the same extent, which may be either partial or substantially complete. Hydrogenated polymers are preferred to minimize degradation during processing, which is a more severe problem with higher molecular weight polymers.

The adhesive compositions of the invention will typically comprise from about 1 wt % to about 20 wt % of the A-B-A block copolymer. Examples include styrene-isoprene-styrene (SIS), styrene-butadiene-styrene (SBS), styrene-isobutylene styrene (SIBS), styrene-b-ethylene/butylene-b-stryrene (SEBS), and/or styrene-b-ethylene/propylene-b-styrene (SEPS).

The adhesives of the invention will typically also comprise from about 30 to about 70 wt % of a tackifying resin, preferably from about 40 to about 70 wt %, more preferably from about 40 to about 65 wt % of a tackifier which is compatible with the midblock of the thermoplastic elastomer. Preferred are tackifiers having a Ring and Ball softening point above about 25° C. Suitable tackifiers include any compatible resins or mixtures thereof such as (1) natural or modified rosins such, for example, as gum rosin, wood rosin, tall-oil rosin, distilled rosin, hydrogenated rosin, dimerized rosin, and polymerized rosin; (2) glycerol and pentaerythritol esters of natural or modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; (3) copolymers and terpolymers of natural terpenes, e.g., styrene/terpene and alpha methyl styrene/terpene; (4) polyterpene resins having a softening point, as determined by ASTM method E28,58T, of from about 80° to 150° C.; the latter polyterpene resins generally resulting from the polymerization of terpene hydrocarbons, such as the bicyclic monoterpene known as pinene, in the presence of Friedel-Crafts catalysts at moderately low temperatures; also included are the hydrogenated polyterpene resins; (5) phenolic modified terpene resins and hydrogenated derivatives thereof, for example, as the resin product resulting from the condensation, in an acidic medium, of a bicyclic terpene and phenol; (6) aliphatic petroleum hydrocarbon resins having a Ball and Ring softening point of from about 700 to 135° C.; the latter resins resulting from the polymerization of monomers consisting of primarily of olefins and diolefins; also included are the hydrogenated aliphatic petroleum hydrocarbon resins; (7) alicyclic petroleum hydrocarbon resins and the hydrogenated derivatives thereof; and (8) aliphatic/aromatic or cycloaliphatic/aromatic copolymers and their hydrogenated derivatives.

Preferred tackifiers for use herein include polyterpenes, aliphatic resins, cycloaliphatic resins, and aliphatic/aromatic or cycloaliphatic/aromatic. More preferred are the aliphatic and cycloaliphatic resins. Examples include Wingtack 95 from Goodyear, Eastotac H100R from Eastman Chemical Company and ESCOREZ 5600 from ExxonMobil Chemical Company. The desirability and selection of the particular tackifying agent can depend upon the specific elastomeric block copolymer employed.

Additionally, it may be desirable to incorporate in the adhesive up to about 30 wt % of an end block tackifier resin. End block resins reside predominantly in the non-elastomer blocks of the thermoplastic elastomer after the adhesive is cooled. Representative of such resins are the primarily aromatic resins based on mixed C9 petroleum distillation streams such as materials available from Eastman Chemical Company, or resins based on pure or mixed monomer streams of aromatic monomers such as homo or copolymers of vinyl toluene, styrene, alpha-methyl styrene, coumarone or indene. Preferred are those based on alpha-methyl styrene available from Eastman Chemical Company under the Kristalex and Plastolyn trade names. If present, the end block resin is generally used in an amount of about 1 to about 30 wt %, preferably less than about 20 wt %.

Preferred adhesive compositions will typically contain from about 40 to about 70 wt % of a tackifying resin which is compatible with the mid-block of the block copolymers and from about 5 to about 30 wt % of a thermoplastic hydrocarbon tackifier which is compatible with the end-block of the block copolymers.

There may also be present in the adhesive an oil or other liquid diluent which is primarily aliphatic in character and is compatible with the thermoplastic elastomer midblock. The compositions of the invention will typically comprise the liquid plasticizer in amounts of less than about 20 wt %. Compositions of the invention will generally comprise at least about 1 wt %, more typically at least about 5 wt % of a liquid plasticizer. Examples include plasticizers such as paraffinic and naphthenic petroleum oils, highly refined aromatic-free paraffinic and naphthenic food and technical grade white petroleum mineral oils, and liquid tackifiers such as the synthetic liquid oligomers of polybutene, polypropene, polyterpene, etc. The synthetic series process oils are high viscosity oligomers which are permanently fluid liquid monolefins, isoparaffins or paraffins of moderate to high molecular weight. Liquid plasticizing or tackifying diluents include polyterpenes such as Wingtack 10 available from Goodyear, and Escorez 2520 based on a $C_5$ feed stream available from Exxon Chemical. Other liquid diluents include polyisoprene, available as LIR 50 from Kuraray, and Amoco's polybutenes available under the name Indopol. Most preferred are paraffinic oils in combination with Escorez 2520, a polymerized $C_5$ petroleum feed stream.

Also, there may be present a wax such as the polyethylene waxes. If used, the wax is generally present in an amount of at least about 2 wt %, up to about 5%.

Finally, antioxidants typically used in the production of rubber based pressure sensitive adhesives may be present in an amount of up to about 3 wt %. Among the useful stabilizers or antioxidants utilized herein are included high molecular weight hindered phenols and multifunctional phenols such as sulfur and phosphorous-containing phenols. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxy group. Representative hindered phenols include: 1,3,5-trimethyl 2,4, 6-tris (3,5-di-tert-butyl-4-hydroxybenzyl) benzene; pentaerythrityl tetrakis-3(3,5-di-tert-butyl-4-hydroxyphenyl)-propionate; 4,4'-methylenebis (2,6-tert-butylphenol); 4,4'-thiobis (6-tert-butyl-o-cresol); 2,6-di-tert-butylphenol; 6-(4-hydroxyphenoxy)-2,4-bis(n-octylthio)-1,2,5-triazine; di-n-octadecyl3,5-d i-tert-butyl-4-hydroxybenzyl phosphonate; 2-(n-octylthio)ethyl 3,5-di-tert-butyl-4-hydroxybenzoate; and sorb itol hexa[3-(3,5-d i-tert-butyl-4-hydroxyphenyl)-propionate].

The hot melt adhesive compositions of the invention may be formulated using techniques known in the art. An exemplary procedure involves placing approximately 20% of the oil or liquid diluent with all the thermoplastic polymers, and stabilizers in a jacketed mixing kettle, preferably in a jacketed heavy duty mixer, which is equipped with rotors and thereupon raising the temperature to a range of from up to about 190° C. After the mixture has been melted, the temperature is lowered to 150° to 165° C. Mixing and heating are continued until a smooth, homogeneous mass is obtained whereupon tackifying resin, wax, and the remainder of the diluent are thoroughly and uniformly admixed therewith.

The adhesive may be applied to a desired substrate by any method known in the art, and include, without limitation roll coating, painting, dry-brushing, dip coating spraying, slot-coating, swirl spraying, printing (e.g., ink jet printing), flexographic, extrusion, atomized spraying, gravure (pattern wheel transfer), electrostatic, vapor deposition, fiberization and/or screen printing.

The adhesive of the invention are useful as positioning adhesives, core adhesives or elastic adhesives, and are particularly suitable for use in the manufacture of articles, including but not limited to disposable absorbent products, such as diapers, adult incontinent products, bed pads; sanitary napkins, and in other absorbent products, such as, bibs, wound dressings, and surgical capes or drapes, which are used to absorb a liquid, such as water and saline, and body liquids, such as urine, menses, and blood. The adhesive may be used to adhere the nonwoven or tissue to another substrate or component. The second substrate may be another nonwoven, tissue, or an unrelated material. The adhesive of the invention will typically be applied to the substrate at temperatures of from about 290° F. to about 325° F.

As described above, an absorbent structure will typically comprise a nonwoven fabric. A nonwoven fabric is defined as an interlocking fiber network characterized by flexibility, porosity and integrity. The individual fibers used to compose the nonwoven fabric may be synthetic, naturally occurring, or a combination of the two. The individual fibers may be mechanically, chemically, or thermally bonded to each other. Nonwovens are used commercially for a variety of applications including insulation, packaging (e.g., foods such as meat), household wipes, surgical drapes, medical dressings, and in disposable articles such as diapers, adult incontinent products and sanitary napkins. Tissue is a closely related material in which the individual fibers may or may not be chemically bonded to one another.

The adhesive may be used to attach the topsheet to the backsheet. Alternatively, the adhesive may be used to adhere either the topsheet or the backsheet to other components of the disposable absorbent product, such as tissue layers, leg flaps, fastening ears, tapes, or tabs, or other components typically used to construct a disposable absorbent product that are well known to one skilled in the art.

Those skilled in the art will recognize materials suitable for use as the topsheet and backsheet. Exemplary of materials suitable for use as the topsheet are liquid-permeable materials, such as spunbonded polypropylene or polyethylene having a basis weight of from about 15 to about 25 grams per square meter. Backsheets often used in disposable absorbent products are generally prepared from liquid-impermeable materials which function to contain liquids, such as water, urine, menses, or blood, within the absorbent core of the disposable absorbent product and to protect bedding and/or a wears' outer garments from soiling. Materials useful as a backsheet in a disposable absorbent product are generally impermeable to liquid but are permeable to vapor. Examples are liquid-impervious materials such as polyolefin films, e.g., polypropylene and polyethylene, as well as vapor-pervious materials, such as microporous polyolefin films, sometimes referred to as breathable films.

The adhesive of the invention is particularly useful as an elastic attachment adhesive. Materials with excellent stretchability and elasticity are needed to manufacture a variety of disposal and durable articles such as, for example, incontinence pads, disposable diapers, training pants, clothing, undergarments, sports apparel, automotive trim, weatherstripping, gaskets, and furniture upholstery. Stretchability and elasticity are performance attributes that can, for example, function to effectuate a closely conforming fit to the body of a wearer or to the frame of an item. While numerous materials are known to exhibit excellent stress-strain properties and elasticity at room temperatures, it is often desirable for elastic materials to provide a conforming or secure fit during repeated use, extensions and retractions at elevated temperatures such as at body temperatures or in automobile interiors during summer months. The adhesives find particular use as elastic attachment adhesive for use in non-woven applications such as baby diaper or adult incontinence items. In addition to the non-woven markets, the hot melt adhesives of the invention are useful in the packaging, converting and bookbinding markets where the desire is to reduce application temperature and, at the same time, keep the toughness and strength of the adhesive.

Disposable elastic articles are typically composite materials prepared from polymer films, elastomeric fibers, non-woven sheets and/or absorbent materials by a combination of fabrication technologies. Elastomeric fibers can be prepared by well known processes such as melt- and solution-spinning and winding. Nonwoven sheets can be prepared by spun bonding, melt blowing, hydroentangling, mechanical entangling and the like. Film and sheet forming processes typically involve known extrusion and coextrusion techniques, e.g., blown film, cast film, profile extrusion, injection molding, extrusion coating, and extrusion sheeting. Polymer films are preferably liquid-impervious materials such as polyolefin films, e.g., polypropylene and polyethylene, as well as vapor-pervious materials, such as microporous polyolefin films, sometimes referred to as breathable films.

Durable elastic articles such as, for example, automotive door and window trim, clothing waist-band threads or strips, and building weather-stripping can be made by well-known molding, thermoforming and profile extrusion technologies.

A material is typically considered elastomeric when it is characterized as having a high percent elastic recovery (i.e., a low percent permanent set) after application of a biasing force. Ideally, elastic materials are characterized by a combination of three, temperature independent properties, i.e., a low percent permanent set, a low stress or load at strain, and a low percent stress or load relaxation. That is, there should be at low to elevated service temperatures (1) a low stress or load requirement to stretch the material, (2) no or low relaxing of the stress or unloading while the material is stretched, and (3) complete or high recovery to original dimensions after the stretching, biasing or straining is discontinued. Thus, an elastomeric polymer is typically a polymer which, free of diluents, has a break elongation in excess of 100% independent of any crimp (when in fiber form) and which when stretched to twice its length, held for one minute, and then released, retracts to less than 1.5 times its original length within one minute of being released. Such polymers include, but are not limited to, natural rubber or synthetic rubbers, segmented polyurethanes (including polyurethaneureas) such as polyetherurethanes and polyesterurethanes, polyetheresters, elastomeric polyethylenes and polypropylenes, and polyetheramides. The article of the invention can comprise substrates comprising such elastomeric polymers in various forms, and such substrates can be used in the process of the invention, provided the benefits of the invention are not adversely affected. The articles of manufacture of the invention can comprise the adhesive and at least one elastomeric substrate such as at least one elastomeric fiber, tape, film, strip, coating, ribbon and/or sheet, and, include substantially linear ethylene polymers and elastomeric substrates such as, for example, spandex (e.g., Lycra® spandex and Lycra® XA, a spandex having little or no lubricating finish thereon). In one embodiment, the substrate comprises spandex or melt spun elastomers. In another embodiment the substrate comprises natural or synthetic rubbers in the form of fibers or in the form of strips less than about 10 mm wide. The adhesive and at least one elastomeric substrate may comprise at least one component of an article of manufacture, Not limiting examples of such components include waistbands, leg bands, bellybands, etc.

The U.S. International Trade Commission defines spandex as a manufactured fiber in which the fiber-forming substance is a long-chain synthetic polymer comprised of at least 85 percent by weight of a segmented polyurethane. Lycra® spandex is known to exhibit nearly ideal, temperature independent elastic properties rendering it very suitable for use in garments, sports apparel and swimsuits.

The invention is further illustrated by the following non-limiting example.

EXAMPLE

In the following example, all parts are by weight and all temperatures in degrees Fahrenheit unless otherwise noted.

Adhesive preparation. The formulations described herein were prepared in a 600 g Brabender mixer with sigma blades. The thermoplastic block copolymers and about 20% of the oil in the formulation were added to the bowl preheated to about 325° F. Once homogenous, mid-block tackifier was added. Finally additional oil and the end block tackifier were added. The blending process ended when the mixture was homogeneous.

The following materials were used to prepare the adhesives:

Vector DPX 589, available from ExxonMobil Chemical Company, is a radial block copolymer of styrene and isoprene and butadiene. It has around 30% styrene and has melt flow index around 8-14 with di-block copolymer percentage of 24%.

Vector 4211, available from ExxonMobil Chemical Company, is a tri-block copolymer of styrene and isoprene with isoprene as soft mid-block. It has around 30% styrene and has melt flow index around 10-16.

Kristalex 3085 is an aromatic hydrocarbon resin which has a Ring and Ball softening point of 82° C. to 88° C.

Eastotac H100, available from Eastman Chemical Company, is a hydrogenated hydrocarbon tackifying resins which has a Ring and Ball softening point of 95° C. to 105° C.

Eastotac H130 is a hydrocarbon resin with softening point between 125° C. to 135° C.

Escorez 5400 is a petroleum hydrocarbon resin obtained from Exxon, which has a softening point of 100 to 106° C.

Calsol 5550, available from Calumet Lubricants Company, is a mineral oil.

IRGANOX 1010FF, available from Ciba-Geigy, is an antioxidant.

The non-woven substrate used in the examples was a spunbond polypropylene manufactured by Avgol.

The polyethylene film used in the example was a corona treated TXEM-244.0 embossed film with thickness of 0.75 mil, manufactured by Pliant Corp.

The adhesives were then subjected to various tests simulating the properties needed for successful commercial applications. These tests are detailed below.

Melt viscosities of the hot melt adhesives were determined on a Brookfield Model RVT Thermosel viscometer using a number 27 spindle.

Creep Performance was evaluated by measuring how much a free-end elastic strand retracts under the stretched condition at end-use temperature (100° F) during a 4-hour period.

The length of a filament (spandex) adhered in the stretched condition between two nonwoven sheets or a nonwoven sheet and a polymeric film was measured ("starting length"). The nonwoven/film and both ends of the spandex were cut and the amount that the resulting free-end filament retracts was measured following a 4 hour period at 100° F. The percent creep was then calculated in the following manner:

$$\% \text{ creep} = \frac{\text{starting length} - \text{final length}}{\text{starting length}} \times 100$$

For example, if the initial distance between marks was 20 cm and the final distance between the marks was 15 cm, the percent creep is 25%. Five samples for each condition were tested and the results averaged for each elastic strand and result recorded.

The formulations tested and the results obtained are shown in Table 1. The adhesive applicator used was a Nordson Spiral spray. Three strands of Lycra Spandex with decitex of 620 were adhered to substrates which contain one 15 gsm spunbond non-woven and one poly-film. The continuous, non-wrapped pattern was used during the adhesive application. The add-on level is 8 mg/in for three strands.

TABLE 1

| Composition | (wt %) |
|---|---|
| Vector DPX 589 | 17 |
| Vector 4211 | 6 |
| Kristalex 3085 | 22 |
| Eastotac H100 | 12 |
| Eastotac H130 | 13 |
| Escorez 5400 | 20 |
| Calsol 5550 | 10 |
| Irgonox 1010 | 0.5 |
| Performance | |
| Average % Creep | 4.1% |
| Viscosity at 300° F. | 7,325 |

This example shows that using (Styrene-Isoprene-Butadiene)$_n$-X in amounts greater than 15 wt % and in combination with a tri-block SIS makes a good elastic attachment adhesive.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:

1. An elastic attachment hot melt adhesive comprising:
(1) 15 wt % to about 35 wt % of a radial block copolymer component comprising (PS-PI- PB) $_n$X wherein PS is polystyrene, PI is polyisoprene and PB is polybutadiene, X is the residue of a multifunctional coupling agent used in the production of the radial block copolymer, and n is equal to or greater than 3 and represents the number of PS-PI-PB arms appended to X,
said radial block copolymer having a styrene content of from 25 wt % to about 50wt %,
said radial block copolymer has a di-block percentage of less than about 25%, based on the amount of the radial block copolymer, and
the number average molecular weight of each arm of said radial block copolymer is from about 30,000 to about 95,000;
(2) about 1 wt% to about 6 wt% of a linear triblock copolymer selected from the group consisting of styrene-isoprene-styrene, styrene-butadiene-styrene and styrene-isobutylene styrene; and
(3) about 30 wt% to about 70 wt % of a tackifying resin;
wherein the wt% is based on the weight of the adhesive composition.

2. The adhesive of claim 1 wherein the radial block copolymer has a di-block percentage of less than about 20%.

3. The adhesive of claim 1 wherein the n is between about 3 and about 6.

4. The adhesives of claim 1 further comprising a wax, said wax being present in an amount of less than about 5 wt %.

5. The adhesive of claim 1 further comprising a liquid plasticizer, said plasticizer being present in amounts of less than about 20 wt %.

6. An article of manufacture comprising the hot melt adhesive of claim 1 and a substrate, wherein
said substrate comprises an elastomeric fiber.

7. The article of claim 6 which is a disposable elastic article.

8. The article of claim 7 which is a diaper.

9. The elastic attachment hot melt adhesive of claim 1 wherein the tackifying resin consists of about 40 wt% to about 60 wt % of a midblock compatible tackifier and about 1 wt% to about 30 wt % of an endblock compatible tackifier.

10. The elastic attachment hot melt adhesive of claim 9 wherein the midblock compatible tackifier is selected from aliphatic resin, cycloaliphatic resin or mixtures thereof.

* * * * *